United States Patent
Walsh

(10) Patent No.: US 7,548,515 B2
(45) Date of Patent: Jun. 16, 2009

(54) APPARATUS FOR MONITORING A NETWORK

(75) Inventor: Peter J. Walsh, Colorado Springs, CO (US)

(73) Assignee: Agilent Technologies, Inc., Santa Clara, CA (US)

(*) Notice: Subject to any disclaimer, the term of this patent is extended or adjusted under 35 U.S.C. 154(b) by 794 days.

(21) Appl. No.: 11/088,986

(22) Filed: Mar. 24, 2005

(65) Prior Publication Data

US 2006/0215566 A1 Sep. 28, 2006

(51) Int. Cl.
H04L 12/26 (2006.01)
H04L 12/28 (2006.01)
H04B 1/44 (2006.01)
H04M 1/24 (2006.01)
H04M 3/08 (2006.01)
G05B 11/01 (2006.01)

(52) U.S. Cl. .............. 370/241; 370/282; 379/1.03; 379/32.01; 340/310.15; 340/310.16

(58) Field of Classification Search .............. 370/241, 370/282; 379/1.03, 32.01; 709/224
See application file for complete search history.

(56) References Cited

U.S. PATENT DOCUMENTS

| | | | | |
|---|---|---|---|---|
| 5,289,359 A | * | 2/1994 | Ziermann | 363/21.11 |
| 5,675,574 A | * | 10/1997 | Norizuki et al. | 370/230 |
| 6,424,627 B1 | | 7/2002 | Sørhaug et al. | |
| 6,720,801 B2 | * | 4/2004 | Houlberg | 327/108 |
| 6,975,209 B2 | * | 12/2005 | Gromov | 375/258 |
| 7,016,948 B1 | * | 3/2006 | Yildiz | 709/221 |
| 7,100,092 B2 | * | 8/2006 | Allred et al. | 714/43 |
| 7,184,428 B1 | * | 2/2007 | Gerszberg et al. | 370/352 |
| 7,466,225 B2 | * | 12/2008 | White et al. | 340/538 |
| 2004/0120259 A1 | | 6/2004 | Jones et al. | |
| 2006/0077888 A1 | * | 4/2006 | Karam et al. | 370/216 |

* cited by examiner

*Primary Examiner*—Chi H Pham
*Assistant Examiner*—Farah Faroul

(57) ABSTRACT

An apparatus to actively monitor a network having a plurality of twisted-pair communication links. The apparatus includes a plurality of amplifiers corresponding, respectively, to the plurality of twisted-pair communication links, each amplifier having a sufficiently high input impedance and common-mode voltage tolerance to non-intrusively copy a data signal transmitted through a corresponding twisted-pair communication link and amplify the copied data signal. The apparatus further includes a plurality of isolation transformers corresponding, respectively, to the plurality of amplifiers, each isolation transformer receiving the amplified, copied data signal from the corresponding amplifier, and outputting a transformed data signal, and a connector receiving the transformed data signals from the plurality of isolation transformers in a pin order corresponding to the plurality of twisted-pair communication links. A protocol analyzer is also provided to receive the transformed data signals via the connector for decoding and monitoring purposes.

11 Claims, 3 Drawing Sheets

APPARATUS FOR MONITORING A NETWORK

BACKGROUND OF THE INVENTION

Description of the Related Art

Most conventional network tap devices are passive devices. That is, the tap devices do not act on network traffic. Therefore, if power is lost to the tap device, the network traffic continues.

However, when power is lost to the conventional network tap device, the conventional network tap device causes an undesirable interruption of the data transmitted between a source network device and a receiving network device. More specifically, conventional network tap devices generally terminate a network connection, recover the clock and data, send a copy to the monitoring protocol analyzer, and at the same time, a copy of the regenerated signal to the receiving network device. A conventional network tap device must include a bypass circuit, which typically closes a relay during a power outage to allow transmitted data signals to pass directly to the receiving network device. Since the bypass circuit employs a relay and requires power to operate, it can cause an undesirable, momentary interruption of the network connection. Additionally, it takes time for a clock and data recovery device to lock to the incoming data and to retime the data so that it can be transmitted out as a regenerated, retimed, full level signal onto the receiving network device. This conventional operation also causes a detectable and undesirable delay in the data of the network connection. The length of the delay varies depending upon the clock and data recovery device utilized.

Further, the conventional network tap devices are established by standards for coaxial interfaces. However, the conventional network tap devices are not configured to accommodate twisted-pair interface standards.

Therefore, it is necessary to provide an apparatus capable of actively monitoring a network having a plurality of twisted-pair communication links without interrupting the customer's data connection.

BRIEF DESCRIPTION OF THE DRAWINGS

These and other aspects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
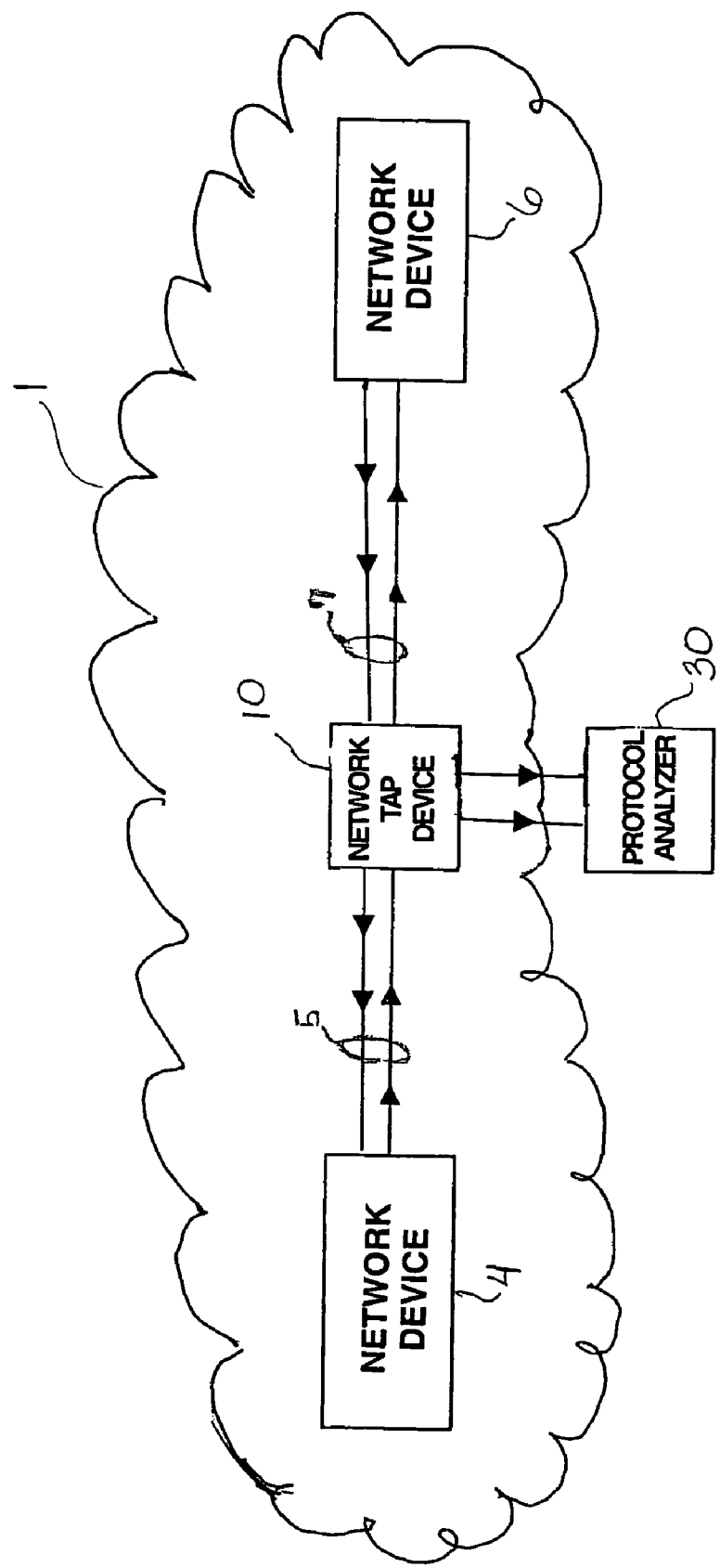
FIG. 1 is a diagram illustrating a network tap device, according to an embodiment of the present invention.

Reference will now be made in detail to the present preferred embodiments of the present invention, examples of which are illustrated in the accompanying drawings, wherein like reference numerals refer to like elements throughout.

FIG. 1 is a diagram illustrating a network tap device according to an embodiment of the present invention. Referring now to FIG. 1, a network 1 comprises two network devices 4 and 6, a network tap device 10 and a protocol analyzer 30. The network tap device 10 is, for example, hard wired on transmission lines 5 and 7 in the network 1 between the network devices 4 and 6. The network tap device 10 may be connected at a predetermined distance from the network device 4 (i.e., the source) or from the network device 6 to which the transmitted data signals are to be received. The protocol analyzer 30 is connected to the network tap device 10 for monitoring network traffic between network devices 4 and 6 in both directions. The number of network devices is not limited to any particular number and may vary accordingly.

Figure 2:
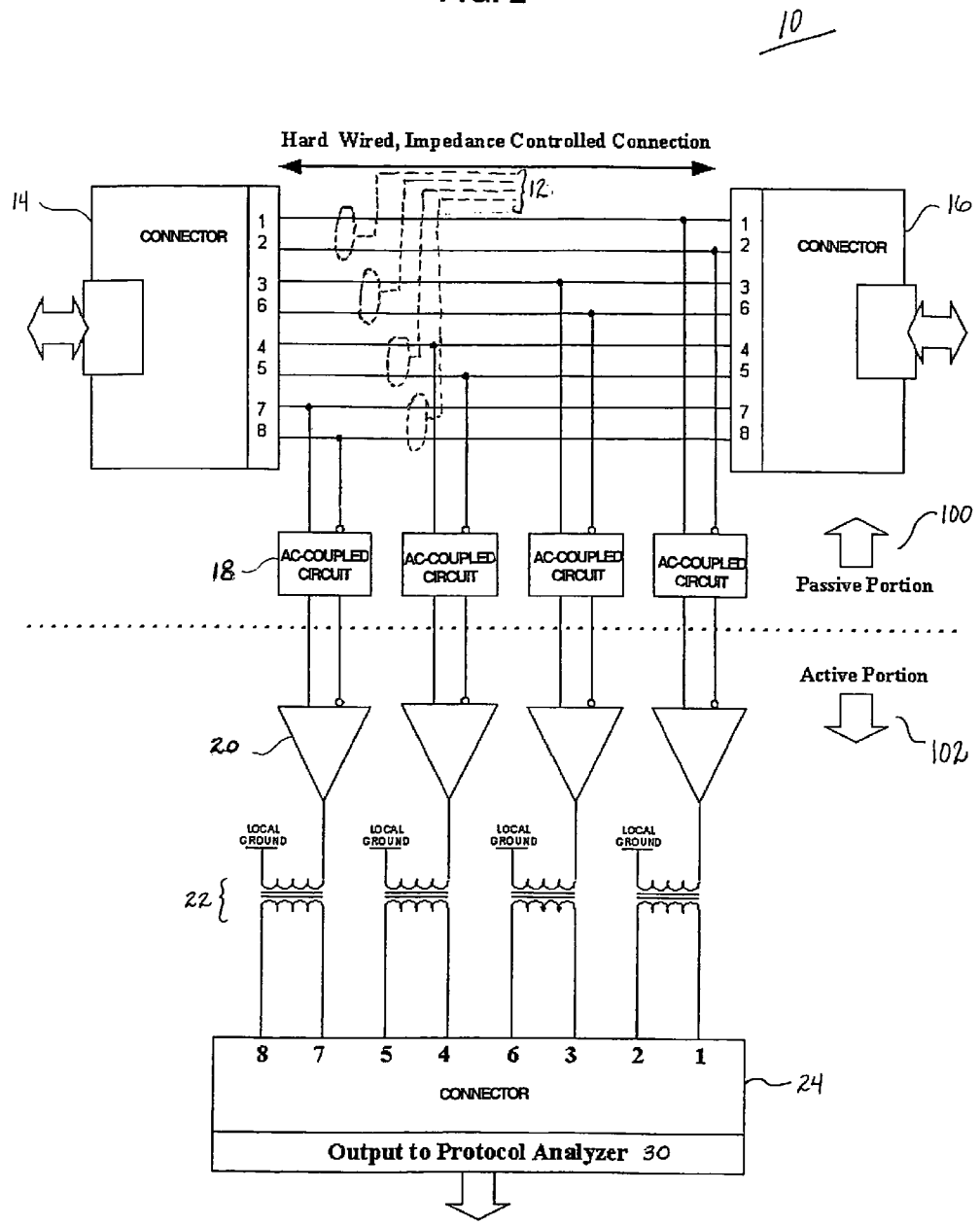
FIG. 2 is a detailed diagram illustrating the network tap device, according to the embodiment shown in FIG. 1, according to an embodiment of the present invention.

FIG. 2 is a detailed diagram illustrating the network tap device 10 as shown in FIG. 1, according to an embodiment of the present invention. Now referring to FIG. 2, the network tap device 10 actively monitors a network 1 having a plurality of twisted-pair communication links 12. The network tap device 10 comprises a passive portion 100 and an active portion 102, which together allow the network tap device 10 to non-intrusively recover, copy and amplify data signals transmitted between network devices 4 and 6 (shown in FIG. 1). The passive portion 100 is provided to non-intrusively recover the transmitted data signals and the active portion 102 is provided to copy and amplify the transmitted data signals.

The passive portion 100 comprises first and second connectors 14 and 16 hard wired at a predetermined distance apart, to carry data signals transmitted from the plurality of twisted-pair communication links 12. The first and second connectors 14 and 16 maintain an impedance-controlled connection with each of the twisted-pair communication links 12. The passive portion 100 further comprises a plurality of alternating-current (AC) coupled circuits 18 corresponding, respectively, to the plurality of twisted-pair communication links 12. Each of the AC coupled circuits 18 comprises a same impedance as the impedance-controlled connection with the corresponding twisted-pair communications link 12, to non-intrusively recover a data signal transmitted from the corresponding twisted-pair communication link 12. The AC coupled circuits 18 further comprise components such as resistors and capacitors and are impedance-matching circuits.

The active portion 102 of the network tap device 10 comprises a plurality of amplifiers 20 corresponding, respectively, to the plurality of AC coupled circuits 18. Each amplifier 20 has sufficiently high input impedance such that it does not alter the transmission line characteristics of the original network connection into which it is installed. More specifically, the AC coupled circuits and the amplifiers are designed to be electrically invisible within that network connection. Additionally, the active portion 102 of this monitor tap is designed to tolerate the undesirable, yet ubiquitous common-mode voltages present in all twisted-pair communication standards.

The active portion 102 of the network tap device 10 further comprises a plurality of isolation transformers 22 corresponding, respectively, to the plurality of amplifiers 20. Each isolation transformer 22 receives the amplified, copied data signal from the corresponding amplifier 20, and outputs a transformed data signal in a same differential format as the original twisted-pair communication link 12. The active portion 102 also comprises a third connector 24 to receive the transformed data signals from the plurality of isolation transformers 22 in a pin order corresponding to the plurality of twisted-pair communication links 12. The protocol analyzer 30 receives the transformed data signals via the third connector 24.

Since, the network tap device 10 reproduces the same electrical transitions of the transmitted data signals and presents a copy of the transmitted data signals to the connector 24, the pin order should be accurate so that it can be connected to the protocol analyzer 30 specifically designed for the associated interface to be monitored.

TABLE 1

Twisted-Pair Interface Standards

| Interface Standard | RJ-45 Pin Number of Receive Pair and Polarity | RJ-45 Pin Number of Transmit Pair and Polarity |
|---|---|---|
| ATM 25.6 Mbit/sec and | −8 | −2 |
| FDDI TP-PMD 125 Mbit/sec | +7 | +1 |
| DDS-4 Wire 772 Kbit/sec | −8 | +2 |
|  | +7 | −1 |
| ISDN Basic Rate 128 Kbit/sec | −5 | −6 |
|  | +4 | +3 |
| E1 2.048 Mbit/sec | −5 | −6 |
|  | +4 | +3 |
| T1 1.544 Mbit/sec | −1 | −4 |
|  | +2 | +5 |
| 10/100 Base T Ethernet | −6 | −2 |
|  | +3 | +1 |

As shown above in Table 1 for a specific example, the network tap device 10 provides differential connections for six different twisted-pair communication standards. Therefore, the plurality of twisted-pair communication links 12 comprises at least two interface standards including ATM 25.6 Mbit/sec, FDDI TP-PMD 125 Mbit/sec, DDS-4, Wire 772 Kbit/sec, ISDN Basic Rate 128 Kbit/sec, E1 2.048 Mbit/sec, T1 1.544 Mbit/sec, and 10/100 Base T Ethernet.

As shown in Table 1, the ISDN Basic Rate and E1 2.048 Mbit/sec share the same pin numbers and polarity. Also, ATM 25.6 and DDS-4 Wire share the same pin numbers, however the polarity is inverted for the transmitted pair. Each of these interface standards have physical layer similarities, such as cable impedance, resistive termination values, but vary widely in bit rate, data encoding method, frequency bandwidth, signal amplitude, maximum cable length, signal return loss, signal cross-talk, and whether or not the unused pairs carry a power supply voltage (such as Power-over-Ethernet). Although Table 1 shows seven twisted-pair interface standards, the present invention is not limited to this number. Further, although Table 1 shows specific twisted-pair interface standards, the present invention is not limited to these specific standards. The present invention is not limited to these specific standards, and may be applied to USB, Firewire, SCSI-LVDS, and any other low voltage, differential signaling, twisted-pair communication interface.

The amplifiers 20 are high input impedance differential amplifiers such as, for example, ANALOG DEVICE model nos. AD8027, AD8129 or AD8065 amplifiers. However, the present invention is not limited to these specific example amplifiers and any suitable amplifier may be utilized. The high input impedance of the amplifiers 20 allows them to recover the transmitted data signals without loading down or altering the electrical characteristics of the twisted-pair interface. The high common mode voltage range allows the amplifiers 20 to replicate the original signal independent of the common mode voltage that may exist. Further, the amplifiers 20 also have sufficient bandwidth and voltage swing capabilities.

Preferably, the first, second and third connectors 14, 16 and 24 are all 8-pin RJ-45 connectors. However, the present invention is not limited to the use of 8-pin RJ-45 connectors, and any suitable connectors may be utilized.

The protocol analyzer 30, for example, may invert the polarity of a pair of signal pins received from connector 24 the output of the network tap device 10 depending upon an associated interface standard to be monitored. More specifically, some data encoding methods are dependent upon the polarity of data transitions carried by twisted-pair interfaces, and a monitoring instrument, such as the protocol analyzer 30 must be able to invert a signal pair in order to recover the data properly. The protocol analyzer 30 also, for example, samples the transformed data signals, verifies a cyclic redundancy check (CRC) and conducts frame delineations. That is, when a user sets a particular standard such as 10/100 Base T Ethernet on the protocol analyzer 30, the protocol analyzer 30 would, for example, search for the data signals on the appropriate pair of signal pins, obtain a signal detect and conduct frame delineations and CRC calculations to try and validate a data packet. The protocol analyzer 30 of the present invention is not limited to performing these particular functions, and may perform other testing procedures.

The network tap device 10 operates at a voltage difference of a given signal pair, and tolerates the normal range of signal amplitude (i.e. automatic gain control) seen on a standards-based conforming network.

The network tap device 10 has a configuration such that when power (needed for the active portion) is lost to the network tap device 10, the transmitted data signals from the network device 4 are not interrupted. The network tap device 10 does not delay the customer's data, and the data received at the protocol analyzer 30 to be monitored is the same as the data transmitted from the network device 4 at any given time (i.e. real-time copy). This is significantly different from a conventional network tap device, which terminates and regenerates the data signal, thereby causing a potentially undesirable delay for a brief period of time.

Figure 3:
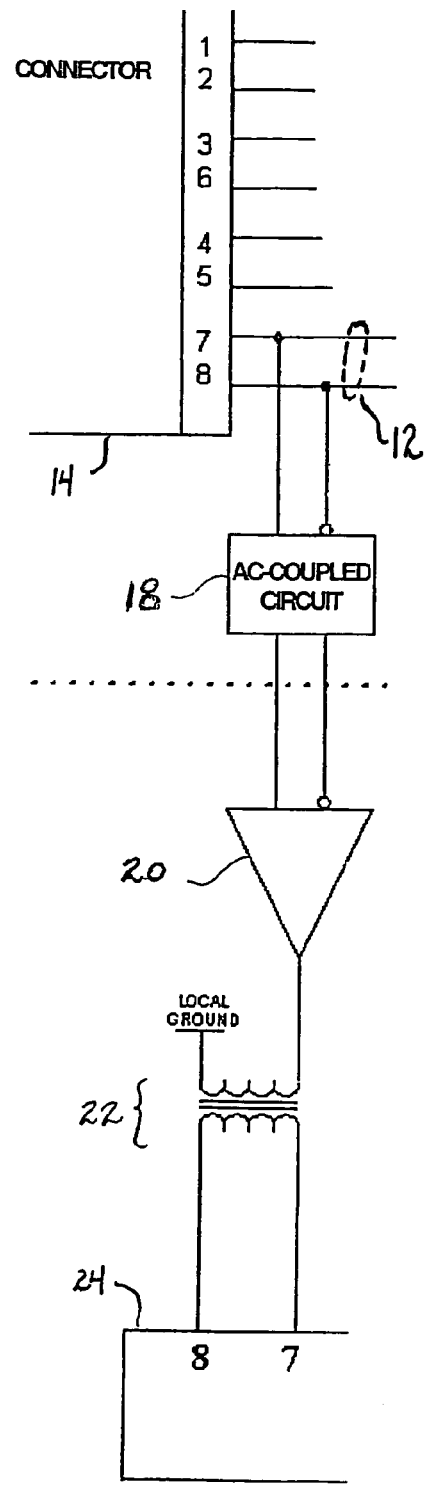
FIG. 3 is a diagram illustrating a twisted-pair communication link of the network tap device shown in FIG. 2, according to an embodiment of the present invention.

FIG. 3 is a diagram illustrating a twisted-pair communication link 12 of the network tap device 10 shown in FIG. 2. Now referring to FIG. 3, the corresponding AC coupled circuit 18 non-intrusively recovers a data signal transmitted from the twisted-pair communication link 12. The amplifier 20 corresponding to the respective AC coupled circuit 18 copies and amplifies the data signal recovered from the respective AC coupled circuit 18. The isolation transformer 22 corresponding to the respective amplifier 20, receives the amplified, copied data signal from the respective amplifier 20 and transforms the data signal back to a differential signaling format, and presents it to the connector 24. The connector 24 receives the transformed data signal from the corresponding isolation transformer 22 in the appropriate pin corresponding to the twisted pair-communication link 12.

Accordingly, it is an aspect of the present invention to provide an apparatus capable of actively monitoring a network having a plurality of twisted-pair communication links, and to non-intrusively recover, copy and amplify transmitted data signals from the network.

Additional aspects and advantages of the invention will be set forth in part in the description which follows, and, in part, will be obvious from the description, or may be learned by practice of the invention.

Aspects of the present invention are achieved by providing an apparatus to actively monitor a network having a plurality of twisted-pair communication links, the apparatus including a plurality of amplifiers corresponding, respectively, to the plurality of twisted-pair communication links. Each amplifier includes a sufficiently high input impedance and tolerance to common-mode voltages to non-intrusively copy a data signal transmitted from the corresponding twisted-pair communication link and amplify the copied data signal. The apparatus further includes a plurality of isolation transformers corresponding, respectively, to the plurality of amplifiers, each isolation transformer receiving the amplified, copied data signal from the corresponding amplifier, and outputting a transformed data signal, and a connector receiving the transformed data signals from the plurality of isolation transformers in a pin order corresponding to the plurality of twisted-pair communication standards, and a protocol analyzer receiving the transformed data signals via the connector.

Aspects of the present invention are further achieved by providing an apparatus to actively monitor a network having a plurality of twisted-pair communication links, the apparatus including first and second connectors hard wired at a predetermined distance apart, to carry data signals transmitted from the plurality of twisted-pair communication links, wherein, the first and second connectors maintain an impedance-controlled connection with each of the twisted-pair communication links. The apparatus further includes a plurality of AC coupled circuits corresponding, respectively, to the plurality of twisted-pair communication links, and each comprising a same impedance as the impedance-controlled connection with the corresponding twisted-pair communications link, to non-intrusively recover a data signal transmitted from the corresponding twisted-pair communication link, and a plurality of amplifiers corresponding, respectively, to the plurality of AC coupled circuits, each amplifier having a sufficiently high input impedance so that it appears electrically invisible to the twisted-pair communication link and tolerance to common-mode voltages such that it can copy and amplify the data signal recovered from the corresponding AC coupled circuit. The apparatus further includes a plurality of isolation transformers corresponding, respectively, to the plurality of amplifiers, each isolation transformer receiving the amplified, copied data signal from the corresponding amplifier, and outputting a transformed data signal, a third connector to receive the transformed data signals from the plurality of isolation transformers in a pin order corresponding to the plurality of twisted-pair communication standards, and a protocol analyzer to receive the transformed data signals via the third connector.

The present invention is not limited to any particular twisted-pair interface standards.

The present invention is also not limited to any particular number of twisted-pair communication links, and may vary accordingly.

Further, the present invention is not limited to the protocol analyzer performing any particular function, and may vary as necessary.

In addition, the present invention is not limited to any particular pin order of the third connector, and may vary accordingly.

The first and second connectors are not limited to being hard-wired into the customer's data connection.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus to actively monitor a network having a plurality of twisted-pair communication links, the apparatus comprising:

a plurality of alternating-current (AC) coupled circuits corresponding, respectively, to the plurality of twisted-pair communication links, and each comprising a same impedance as an impedance-controlled connection with the corresponding twisted-pair communications link, to non-intrusively recover a data signal transmitted from the corresponding twisted-pair communication link;

a plurality of amplifiers corresponding, respectively, to the plurality of twisted-pair communication links, each amplifier having an input impedance and common-mode voltage tolerance to non-intrusively copy a data signal transmitted from the corresponding twisted-pair communication link and amplify the copied data signal;

a plurality of isolation transformers corresponding, respectively, to the plurality of amplifiers, each isolation transformer receiving the amplified, copied data signal from the corresponding amplifier, and outputting a transformed data signal;

a connector receiving the transformed data signals from the plurality of isolation transformers in a pin order corresponding to the plurality of twisted-pair communication links; and a protocol analyzer receiving the transformed data signals via the connector.

2. The apparatus of claim 1, wherein the plurality of twisted pair communications links comprise at least two interface standards including ATM 25.6 Mbit/sec, FDDI TP-PMD 125 Mbit/sec, DDS-4 Wire 772 Kbit/sec, ISDN Basic Rate 128 Kbit/sec, E1 2.048 Mbit/sec, T1 1.544 Mbit/sec, and 10/100 Base T Ethernet.

3. The apparatus of claim 2, wherein the protocol analyzer inverts a polarity of the interface standards included in the different twisted-pair communication links depending upon a data encoding method associated with the interface to be monitored.

4. The apparatus of claim 3, wherein the protocol analyzer samples the transformed data signals and verifies a cyclic redundancy check and conducts frame delineations.

5. The apparatus of claim 1, wherein the connector is an 8-pin RJ-45 connector.

6. The apparatus of claim 1, wherein the apparatus is connected at a source of the transmitted data signals or a destination to which the transmitted data signals are to be received or at a position in between the source or the destination of the transmitted data signals.

7. The apparatus of claim 1, wherein the apparatus has a configuration that, when power is lost to the apparatus, the transmitted data signals are not interrupted.

8. An apparatus to actively monitor a network having a plurality of twisted-pair communication links, the apparatus comprising:

first and second connectors hard wired at a predetermined distance apart, to carry data signals transmitted from the plurality of twisted-pair communication links, wherein, the first and second connectors maintain an impedance-controlled connection with each of the twisted-pair communication links;

a plurality of alternating-current (AC) coupled circuits corresponding, respectively, to the plurality of twisted-pair communication links, and each comprising a same impedance as the impedance-controlled connection with the corresponding twisted-pair communications link, to non-intrusively recover a data signal transmitted from the corresponding twisted-pair communication link;

a plurality of amplifiers corresponding, respectively, to the plurality of AC coupled circuits, each amplifier having an input impedance to allow each amplifier to appear electrically invisible to the corresponding twisted-pair communication link and a tolerance to common-mode voltages to allow each amplifier to copy and amplify the data signal recovered from the corresponding AC coupled circuit;

a plurality of isolation transformers corresponding, respectively, to the plurality of amplifiers, each isolation transformer receiving the amplified, copied data signal from the corresponding amplifier, and outputting a transformed data signal;

a third connector to receive the transformed data signals from the plurality of isolation transformers in a pin order corresponding to the plurality of twisted-pair communication links; and a protocol analyzer to receive the transformed data signals via the third connector.

9. The apparatus of claim 8, wherein the plurality of twisted pair communications links comprise at least two interface standards including ATM 25.6 Mbit/sec, FDDI TP-PMD 125 Mbit/sec, DDS-4 Wire 772 Kbit/sec, ISDN Basic Rate 128 Kbit/sec, E1 2.048 Mbit/sec, T1 1.544 Mbit/sec, and 10/100 Base T Ethernet.

10. The apparatus of claim 9, wherein the first, second and third connectors are 8-pin RJ-45 connectors.

11. An apparatus to actively monitor a network having a plurality of twisted-pair communication links, the apparatus comprising:

a plurality of alternating-current (AC) coupled circuits corresponding, respectively, to the plurality of twisted-pair communication links, and each comprising a same impedance as an impedance-controlled connection with the corresponding twisted-pair communications link, to non-intrusively recover a data signal transmitted from the corresponding twisted-pair communication link;

a plurality of amplifiers corresponding, respectively to the plurality of twisted-pair communication links, each amplifier having an input impedance and common-mode voltage tolerance to non-intrusively copy and amplify a data signal transmitted from the corresponding twisted-pair communication link; and a monitoring device to receive the amplified, copied data signals.

* * * * *